United States Patent
Boerrigter et al.

(10) Patent No.: US 10,129,339 B1
(45) Date of Patent: Nov. 13, 2018

(54) COMMUNICATION SYSTEM CONFIGURED FOR TRANSMITTING SENSOR VALUES FROM N SENSING SOURCES TO A CONTROL UNIT

(71) Applicant: Sensata Technologies, Inc., Attleboro, MA (US)

(72) Inventors: Mark Johannes Gerhardus Boerrigter, Oldenzaal (NL); Danny Johannes Hendrikus Slotboom, Winterswijk (NL)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 15/813,364

(22) Filed: Nov. 15, 2017

(51) Int. Cl.
 *H04L 25/38* (2006.01)
 *H04L 29/08* (2006.01)
 *H04L 12/40* (2006.01)

(52) U.S. Cl.
 CPC .... *H04L 67/12* (2013.01); *H04L 2012/40208* (2013.01); *H04L 2012/40273* (2013.01)

(58) Field of Classification Search
 CPC ........... H04L 67/12; H04L 2012/40208; H04L 2012/40273; G06F 13/4239
 USPC ............................................. 375/370; 702/19
 See application file for complete search history.

(56) References Cited

U.S. PATENT DOCUMENTS

| 7,717,085 | B1 | 5/2010 | Bauerle |
| 2012/0195389 | A1 | 8/2012 | Scherr |
| 2014/0316713 | A1* | 10/2014 | Chmiel ............... G06F 13/4239 702/19 |
| 2016/0087672 | A1 | 3/2016 | Hammerschmidt |
| 2016/0098374 | A1 | 4/2016 | Drescher |
| 2016/0119006 | A1 | 4/2016 | Hammerschmidt et al. |
| 2016/0124798 | A1 | 5/2016 | Shevelenok et al. |
| 2017/0059381 | A1 | 3/2017 | Ban et al. |

FOREIGN PATENT DOCUMENTS

| DE | 10065297 | 7/2002 |
| EP | 1477656 | 11/2004 |
| KR | 20130107683 | 10/2013 |

* cited by examiner

*Primary Examiner* — Phuong Phu
(74) *Attorney, Agent, or Firm* — Burns & Levinson, LLP; Joseph M. Maraia

(57) ABSTRACT

A communication system for transmitting sensor values to an Electronic Control Unit ("ECU") includes a chain of ASICs (sensor interface devices). Each ASIC is coupled to sensors. All sensors connected to an ASIC are measured by said ASIC to obtain sensor values for transmission via a SENT stream in the direction of an ECU. An ASIC is further able to read and decode a Single Edge Nibble Transmission ("SENT") stream from a previous ASIC in the chain. The ASIC combines its own measurements with the measurements received via the SENT stream to one SENT output stream carrying the sensor values of all sensors connected to said ASIC and all previous ASIC in the chain for transmission to a subsequent ASIC in the chain or the ECU. Only one SENT-input is needed at the ECU to receive measurements from multiple sensors, wherein the number of sensors can easily be changed.

14 Claims, 5 Drawing Sheets

COMMUNICATION SYSTEM CONFIGURED FOR TRANSMITTING SENSOR VALUES FROM N SENSING SOURCES TO A CONTROL UNIT

TECHNICAL FIELD

The subject disclosure relates to a communication system configured for transmitting sensor values from N sensing sources to a control unit, N being an integer greater than 1. The subject disclosure further relates to a method for transmitting sensor values from N sensing sources to a control unit, N being an integer greater than 1.

BACKGROUND ART

In automotive electronics, an Electronic Control Unit (ECU) is any embedded system that controls one or more of the electrical systems or subsystems in a transport vehicle. Types of ECU include Electronic/engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, or control module. In the beginning, each sensor had its own input at the ECU. As the number of sensors increases, the number of inputs at the ECU has to increase too. To decrease the number of sensor inputs at the ECU, sensors are developed which send values of multiple sensors over a serial link. The TLE4998C3 manufactured by Infineon is a programmable Linear Hall Sensor which transmits digitally, by means of the SPC (Short PWM Code) protocol with enhanced features based on SENT (Single Edge Nibble Transmission, defined by SAE J2716), a value derived from the Hall-Cell and the temperature of the Hall-Cell to an ECU.

SENT is a recently developed serial protocol used for sensors in the automotive industry. SENT exhibits several advantages over older serial links. SENT enable to provide sensors having a high resolution, which are immune to Electro Magnetic Perturbations and which are cost effective. An example of a SENT sensor is the Melexis 90809 Sensor. This sensor measures relative Pressure as well as Temperature, both with a 12 bit resolution. It is a fully integrated IC that comprises MEMS, analog front end circuitry, 16 bit microcontroller, analog back end circuitry and voltage regulators.

SUMMARY OF INVENTION

Multiple sensors with a combined SENT output enable fewer ECU inputs and reduced wiring costs. Such sensors normally perform internally by electronic circuitry at least one of the following functions: temperature compensation of the sensor signal; calibration; internal fault detection; and conversion of the electrical signal(s) from the sensor(s) to a conditioned measurement signal. The implementation of these functions may depend on requirements which are user dependent. It is economically not attractive to make a new ASIC comprising the desired functions and combination of sensors for every application.

It is an object of the present technology to provide a communication system configured for transmitting sensor values of N sensing sources to a control unit which overcomes at least one of the disadvantages of the known communication methods to transmit sensor values to a control unit. The present technology enables us to combine several sensor arrangements and sensor units provided with sensing element(s) and specific conditioning electronics and to supply the measured and optionally conditioned values of the several arrangements and sensors units to a control unit by using only one input of the control unit. A sensing source according to the present application is an electronic circuit comprising one or more sensing elements configured to measure one or more physical quantities.

In a communication system according to the present technology, the system comprises a first sensor interface device $SID\_1$ and $Y-1$ intermediate sensor interface devices, where Y is an integer greater than 1. The first sensor interface is configured for sampling M sensing sources to obtain M sensor values related to the M sensing sources, M being an integer greater than 0. The first sensor interface device is further configured for transmitting at an output of the first sensor interface device, the M sensor values using an asynchronous unidirectional protocol. Each intermediate sensor interface device $SID\_i$ is configured for sampling $P\_i$ sensing sources to sensor values related to the $P\_i$ sensing sources, $P\_i$ being an integer greater than 0 and $2 \leq i \leq Y$. The intermediate sensor interface device $SID\_i$ is further configured for receiving at an input first data groups comprising data values related to $Q\_i$ sensing sources using the asynchronous unidirectional protocol, where $Q\_i$ is an integer greater than 0. The intermediate sensor interface device $SID\_i$ is further configured for transmitting via an output, second data groups comprising data values related to the $P\_i$ sensing sources and data values related to the $Q\_i$ sensing sources using the asynchronous unidirectional protocol. The input of intermediate sensor interface device $SID\_2$ is coupled to the output of sensor interface device $SID\_1$ and for $i>2$, the input of intermediate sensor interface device $SID\_i$ is coupled to the output of sensor interface device $SID\_i-1$. The output of intermediate sensor interface device $SID\_Y$ is configured for transmitting third data groups to an input of the control unit using the asynchronous unidirectional protocol, a third data group comprising sensor values related to the $P\_Y$ sensing sources of sensor interface device $SID\_Y$ and data values related to $Q\_Y$ sensing sources received from $SID\_Y-1$, wherein $P\_Y+Q\_Y=N$.

These features enable a chain of sensors wherein each sensor sends autonomous sensor data of the sensors in the direction of an ECU. This reduces the complexity of the transmitter as no synchronization and handshaking circuitry is needed in the transmitter. Furthermore, there is no need to have the sensors running at the same clock frequency. Secondly, only one input at the ECU is needed to receive all values of the sensors in the chain of sensors. Furthermore, these features enable one to reduce wiring costs from the sensors to an ECU, it allows one to create user specific ASICs for specific sensing sources wherein the sensor values are generated by user specific algorithms and to easily assemble a sensor system comprising the desired sensing sources which values are obtained by the user required algorithm. There is no need to develop a new ASIC in the chain when one ASIC with a particular sensing source and algorithm is replaced by another ASIC with another sensing source and/or algorithm. Applications for sensors might be: temperature sensors; or combined sensors like pressure and temperature. A typical application for such a sensor is the Gasoline Particle Filter.

In one embodiment, the communication system functions in the following way. The first sensor in the chain samples its sensing source(s) and supplies the value(s) of the sensing source(s) to the second sensor in the chain. The second sensor receives the value(s) of the sensing source(s) of the first sensor, and samples its own sensing sources to obtain corresponding values. Subsequently it transmits values of the corresponding sensing sources received from the first sensor and the values of its own sensing sources to the subsequent sensor in the chain when it is not the last sensor in the chain. The last sensor in the chain transmits values related to all sensing sources of all sensors in the chain to an input of an ECU.

In an embodiment, the intermediate sensor interface device SID_i is further configured to determine from the data values of first data groups for each of the Q_i sensing sources. The intermediate sensor interface device SID_i can also determine: a storage value to be stored in a memory location associated with a corresponding sensing source. The sensor interface device SID_i is further configured for transmitting the storage value from the memory location associated with the corresponding sensing source in a second data group. Normally, the data rate of data values of a sensing source at the input of a sensor interface device is higher than the data rate of data values for said sensing source at the output of the sensor interface device. These features enable use of all data values of a sensing source received at an input of an intermediate sensor interface device to determine, with an algorithm, storage values suitable for transmission at the output of the sensor interface device. In a further embodiment, the storage value in a storage location associated with one of the Q_i sensing sources is one of: the average value; the maximum value; the minimum value; the first value; and the latest value of the data values related to said one of the Q_i sensing sources retrieved after transmission of the storage value from said storage location associated with said one of the Q_i sensing sources.

In an embodiment, the intermediate sensor interface device is further configured to transmit in a second data group two or more data values related to at least one of the P_i and the Q_i sensing sources. This feature enables transmitting to the ECU data values of sensing sources at different data rates. This is advantageous in case the communication system has, for example, to transmit fast varying pressure and slowly varying temperature to an ECU.

In an embodiment, the second data groups comprise P_i+Q_i data values related to the P_i sensing sources and the Q_i sensing sources. In a preferred embodiment, the intermediate sensor interface device SID_i is configured to transmit, in a second data group, the P_i data values related to the P_i sensing sources prior to the Q_i sensor values related to the Q_i sensing sources. These features allow one to change the order and/or length of the chain of sensor interface devices without the need to change settings and/or algorithms in a sensor interface device. Only the ECU has to be adapted to know the order of the data values of the sensing sources in the data groups received at its input. Furthermore, these features provide an implementation which requires less complex circuitry to store temporarily the received values of the sensing sources prior in the chain of sensors and to supply the stored values in the direction of the ECU together with its own values.

In an embodiment, the number of received groups of Q_i sensor values related to the Q_i sensing source per second is higher than the number of transmitted groups of P_i+Q_i sensor values. This feature enables reducing the delay time between the sampling time of a sensing source and the receipt of the corresponding value at the ECU.

In an embodiment, the intermediate sensor interface device SID_i further comprises a detector configured to derive the number Q_i of sensor values related to the Q_i sensing sources in a signal received at the input of sensor interface device SID_i; and wherein the sensor interface device is further configured to adapt the number of transmitted sensor values corresponding the P_i and Q_i sensing sources in response to the derived number Q_i of sensor values. These features provide an intermediate sensor interface which automatically adapts the number of values of a group at the output to a number which corresponds to the number of values of the groups received at the input plus the number of values in a group received at its input. Consequently, if in a design, the number of sensing sources to be transmitted to the ECU of sensor interface devices prior in the chain has to be increased, there is no need to replace the current intermediate sensor interface device by another intermediate sensor interface which allows forwarding the increased number of values. Only, the ECU has to be reprogrammed to correctly receive the increased number of values.

In an embodiment, a sensing source of the P_i sensing sources of the intermediate sensor interface device SID_i is coupled to a sensor input of the sensor interface device SID_i or embedded in the sensor interface device SID_i. This feature allows a designer to choose the desired implementation for a particular application.

In an embodiment, the asynchronous unidirectional protocol is the SENT-protocol. This protocol is particularly advantageous in automotive applications over other possible asynchronous unidirectional protocols, for example a protocol based on the RS422 standard.

In a second aspect, there is provided a sensing device enabling creation of a chain of sensing devices wherein only the last sensing device in the chain supplies sensor values directly to the ECU. After creating the chain, the ECU only has to know the order in which the values of the sensing sources are transmitted to the ECU.

In another embodiment, there is provided a method for transmitting sensor values from N sensing sources to a control unit via an asynchronous unidirectional interface. Still another embodiment is directed to a communication system for transmitting sensor values from N sensing sources to a control unit, N being an integer greater than 1, the communication system comprising: a first sensor interface device SID_1 for: sampling M sensing sources to obtain M sensor values related to M sensing sources, M being an integer greater than 0; and transmitting, at an output of the first sensor interface device, the M sensor values related to the M sensing sources using an asynchronous unidirectional protocol; Y−1 intermediate sensor interface devices SID_i, wherein Y is an integer greater than 1 and $2 \leq i \leq Y$; and each intermediate sensor interface device SID_i for sampling P_i sensing sources to obtain sensor values related to the P_i sensing sources, P_i being an integer greater than 0, wherein: the intermediate sensor interface devices SID_i receive at an input, first data groups comprising data values related to Q_i sensing sources using the asynchronous unidirectional protocol, Q_i being an integer greater than 0; the intermediate sensor interface devices SID_i transmit via an output, second data groups comprising sensor values related to the P_i sensing sources and data values related to the Q_i sensing sources using the asynchronous unidirectional protocol; and the input of intermediate sensor interface device SID_2 being coupled to the output of sensor interface device SID_1 and for i>2, the input of intermediate sensor interface device SID_i being coupled to the output of sensor interface device SID_i−1, wherein the output of intermediate sensor interface device SID_Y transmits third data groups, each third data group comprising sensor values related to the P_Y sensing sources of sensor interface device SID_Y and data values related to Q_Y sensing sources, the third data groups being transmitted to an input of the control unit using the asynchronous unidirectional protocol, wherein P_Y+Q_Y=N. Still a further embodiment is directed to a sensing device comprising: a sensor interface device; and P sensing sources, wherein: P≥1; the sensor interface device samples the P sensing sources to obtain P sensor values related to the P sensing sources; the sensor interface device transmits, at an output of the sensing interface device, P sensor values related to the P sensing sources using an asynchronous unidirectional protocol; and the sensing interface device includes an input configured for receiving Q sensor values related to Q sensing sources using the asynchronous unidirectional protocol, Q being an integer greater than 0. Still another embodiment is directed to a method for transmitting sensor values from N sensing sources to a control unit, N being an integer greater than 1, the method comprising: a sensor interface device SID_1 sampling M sensing sources to obtain M sensor values related to the M sensing sources, M being an integer greater than 0; sensor interface device SID_1 transmitting at M sensor values related to the M sensing sources to an intermediate sensor interface device SID_2 using an asynchronous unidirectional protocol; intermediate sensor interface devices SID_i sampling P_i sensing sources to obtain sensor values related to the P_i sensing sources, P_i being an integer greater than 0, wherein 2≤i≤Y and Y≥2; the sensor interface devices SID_i receive first data groups at an input using the asynchronous unidirectional protocol, the first data groups including data values related to Q_i sensing sources from sensor interface device SID_i−1, wherein Q_i is an integer greater than 0; the sensor interface device SID_i transmitting second data groups at an output using the asynchronous unidirectional protocol, the second data groups including sensor values related to the P_i sensing sources and data values related to the Q_i sensing sources; and, the control unit receiving, at an input, second data groups transmitted by sensor interface device SID_Y using the asynchronous unidirectional protocol, wherein the second data groups include data values related to P_Y+Q_Y sensing sources, wherein P_Y+Q_Y=N.

Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which.

DESCRIPTION OF EMBODIMENTS

The advantages, and other features of the technology disclosed herein, will become more readily apparent to those having ordinary skill in the art from the following detailed description of certain preferred embodiments taken in conjunction with the drawings which set forth representative embodiments of the present technology.

A sensing source according to the present application is an electronic circuit comprising at least one sensing element configured to measure at least one physical quantity. For example, a sensing arrangement could comprise a Wheatstone bridge with two similar strain gauges as sensing elements in a leg of the Wheatstone bridge. This sensing arrangement could be used as a sensing source to measure pressure acting on a membrane by measuring the voltage at the output of the Wheatstone bridge. However, this sensing arrangement could also be used as a sensing source to measure the temperature of the membrane by measuring the current through the Wheatstone bridge. Thus, a Wheatstone bridge could be used as two different sensing sources by sensing simultaneously or alternating the output voltage of the Wheatstone bridge and the current through the Wheatstone bridge, representative for pressure and temperature respectively. In another embodiment, a sensing arrangement is configured to measure a temperature difference. In this embodiment, the sensing arrangement comprises two sensing elements, e.g., thermistors with a negative temperature coefficient (NTC). One of the two sensing elements is part of a first electronic circuit to measure the temperature at a first location. The other of the two sensing elements is part of a second electronic circuit to measure the temperature at a second location. The sensing arrangement further comprises electronics to determine the difference between the two sensed temperatures. In this embodiment, two sensing circuitry/units with a sensing element are used in one sensing arrangement to form one sensing source to measure one physical quantity.

Figure 1:
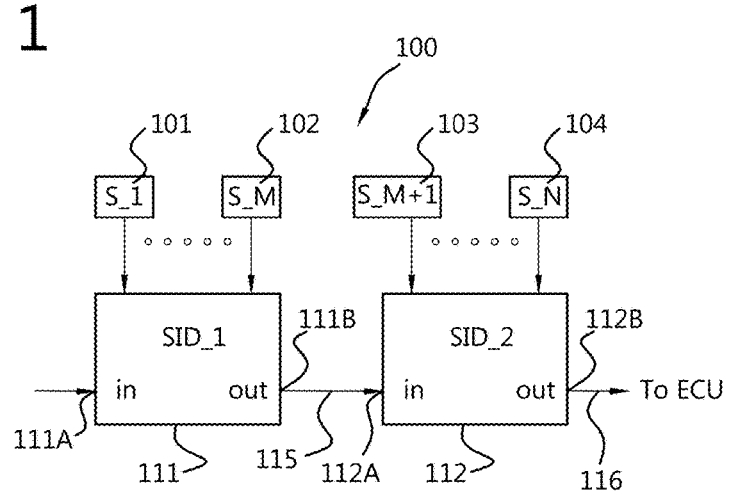
FIG. 1 shows schematically the general concept of a communication system.

FIG. 1 shows schematically the general concept of a communication system 100 configured for transmitting sensor values from N sensing sources to a control unit according to the present application. The communication system comprises a chain of sensor interface devices 111, 112. In FIG. 1, the chain comprises two sensor interface devices 111, 112. A sensor interface device comprises conversion circuitry configured to convert an analog signal from a sensing source representing a physical quantity to a sampled digital signal. Examples of physical quantities are not limited to: temperature, pressure, force, stress, flow, concentration of particular elements in a gas, and conductivity. A sensor interface device further comprises circuitry to transmit sample values of the digital signal derived from the analog signal from a sensing source by means of a digital protocol to or in the direction of an Electronic Control Unit ECU. In the present application, the SENT-protocol (Single Edge Nibble Transmission, defined by SAE J2716) will be used to elucidate the functioning of the communication system. SENT is an asynchronous unidirectional protocol. This means that data is transmitted in one direction over a wired communication link between a first device (transmitter) and a second device (receiver). The first device sends autonomous digital data to the transmitter. So the second device does not send any signal to the first device indicating when the first device has to send data. Furthermore, the first device and second device are running at their own clock frequency. So the clock frequencies of the circuitry used for transmission at the first device and reception at the second device are not synchronized. The electronic circuitry of the sensor interface device comprises at least an A/D convertor and could optionally comprise one of the following functions: temperature compensation of the sensor signal, calibration, internal fault detection, and conversion of the electrical signal(s) from the sensor(s) to a conditioned measurement signal. The implementation of and or algorithms for these functions often depends on specific client/manufacturer requirements.

In the present application, SID_1 refers to the first sensor interface device of the chain. SID_i in the present application refers to the $i^{th}$ sensor interface device of the chain. A chain comprises Y sensor interface devices wherein Y is an integer greater than 1. The first sensor interface device SID_1 of the chain is the device at the end of the chain which is not connected to the ECU. The sensor interface device SID_i for which holds that $2 \leq i \leq Y$ are intermediate sensor interface devices as they are located between the first sensor interface device SID_1 and the ECU. An intermediated Sensor Interface Device combines in an output signal sensor data generated by measurement of sensing sources by its own and sensor data received at its input from another sensor interface device. An intermediate sensor interface device forwards sensor values of a known number of sensing sources measured by at least one other sensor interface device in the direction of an ECU. The first sensor interface device SID 1 does not receive sensor data from another sensor interface device and does not need an input to receive sensor data from another sensor interface device. However, it might be possible, as shown in FIG. 1 that the first sensor interface device SID_1 is a component suitable to be used as intermediate sensor interface device SID_i with i>1. In that case SID_1 comprises an input 111A which is not connected to another sensor interface device. In the present application, S_i or Si refers to the $i^{th}$ sensing source in the chain of sensor interface devices.

In FIG. 1, the first sensor interface device SID_1 111 is configured for sampling M sensing sources S_1 . . . S_M 101, 102 to obtain M sensor values related to the M sensing sources. M is an integer greater than 0. The first sensor interface device SID_1 is further configured for transmitting at an output 111B of the first sensor interface device 111 M sensor values related to the M sensing sources using an asynchronous unidirectional protocol, for example SENT. The first sensor interface SID_1 repeatedly transmits M sensor values related to the M sensing sources S_1 . . . S_M. The second sensor interface device SID_2 of the chain, which is an intermediate sensor interface device, comprises an input 112A electrically coupled to the output 111B of the first sensor interface device SID_1 by a link 115. Over this link, the second sensor interface device SID_2 receives M sensor values related to the M sensing source S_1 . . . S_M. The second sensor interface device SID_2 is further configured for sampling N-M sensing sources S_M+1 . . . S_N to obtain N-M sensor values related to the N-M sensing sources coupled to conversion circuitry of the second interface device. The second sensor interface SID_2 transmits repeatedly at output 112B N sensor values including M sensor values related to the M sensing sources S_1 . . . S_M received via input 112A and N-M sensor values related to the sensing sources S_M+1 . . . S_N. The output 112B of the second sensor interface device SID_2 could be coupled to an ECU or a third sensor interface device SID_3, not shown. Thus, the second interface device transmits repeatedly sensor values of all sensing sources of its own sensing sources together with sensor values of all sensing sources which are sampled by the first sensor interface device SID 1.

The communication system according to the present application comprises a chain of Y sensor interface devices. Sensor interface device SID_i transmits the sensor values related to all sensing sources of SID_1 to SID_i. If P_i is the number of sensing sources sampled by SID_i, SID_i will repeatedly transmit P_1+P_2+ . . . +P_i sensor values. An intermediate sensor interface device SID_i will repeatedly receive at its input P_1+P_2+ . . . +P_i−1 sensor values. The last sensor interface device SID_Y repeatedly transmits, to a control unit ECU, the sensor values of all sensing sources of the communication system.

An intermediate sensor interface device SID_i comprises at least Q_i memory locations to store the received Q_i sensor values related to Q_i sensing sources in corresponding Q_i memory locations. In the sensor interface, device SID_i is further configured for retrieving Q_i sensor values from the Q_i memory locations prior to transmission. Each time a new sensor value of a sensing source S_i is received at the input of the intermediate sensor interface device, the sensor value in the memory location related to sensing source S_i is overwritten by the new sensor value.

In an embodiment, the sensor interface device SID_i is configured to transmit each cycle of serially transmitting the P_i+Q_i sensor value first the P_i sensor values related to the P_i sensing sources which are sampled by the circuitry of the intermediate sensor interface device SID_i and subsequently the Q_i sensor values related to the sensor values received via the input coupled to SID_i−1. It has been found that this embodiment is advantageous over the embodiment wherein the Q_i sensor values are transmitted prior to transmission of the P_i sensor value with respect to the maximum difference between the actual sampling times of the P_i+Q_i samples when received by the ECU.

To minimize, delay time between sampling a sensing source and receipt of the sensor value at the ECU, each intermediate sensor device transmits continuously serially sensor values in the direction to the ECU. In that case, the number of received groups of Q_i sensor values related to the Q_i sensing sources per second received at its input is higher than the number of groups of P_i+Q_i sensor values related to the P_i and the Q_i sensing sources transmitted at its output.

An intermediate sensor interface device SID_i could be designed to repeatedly receive a fixed number of Q_i sensor values related to Q_i sensor elements. In this case, the intermediate sensor interface device SID_i comprises Q_i memory locations to store the received sensor values and to forward stored values in the direction of an ECU. In an alternative embodiment of an intermediate sensor interface device SID_i, the device comprises a detector configured to derive the number Q_i of sensor values related to Q_i sensing sources from a signal received at the input of sensor interface device SID_i. The intermediate sensor interface device is further configured to adapt the number Q_i of repeatedly transmitted sensor values of corresponding sensing sources in response to the derived number Q_i. In this embodiment, SID_i comprises a number of memory locations to store sensors values of different sensing sources large enough to store the maximum number of sensors values of different sensing sources that could repeatedly be transmitted by the asynchronous unidirectional interface. For the implementation described below with use of the SENT protocol the maximum number is 16. In use, when the detector detects that Q_i sensor values of Q_i different sensing sources are repeatedly received at its input, only Q_i memory locations are used. When a sensor interface device of the chain, which is not the last intermediate sensor interface device of the chain, will be replaced by a sensor interface device which samples a different number of sensing sources to be transmitted to an ECU. A SID's with detector will detect the change in number of repeatedly received sensor values and change in response to this the number of sensor values that has to be forwarded in the direction of the ECU.

In another embodiment, the sensor interface device comprises, instead of a detector, a user programmable parameter representing the number of Q_i sensor values related to Q_i different sensing sources that are repeatedly received at the input of the intermediate sensor interface device SID_i.

Figure 2:
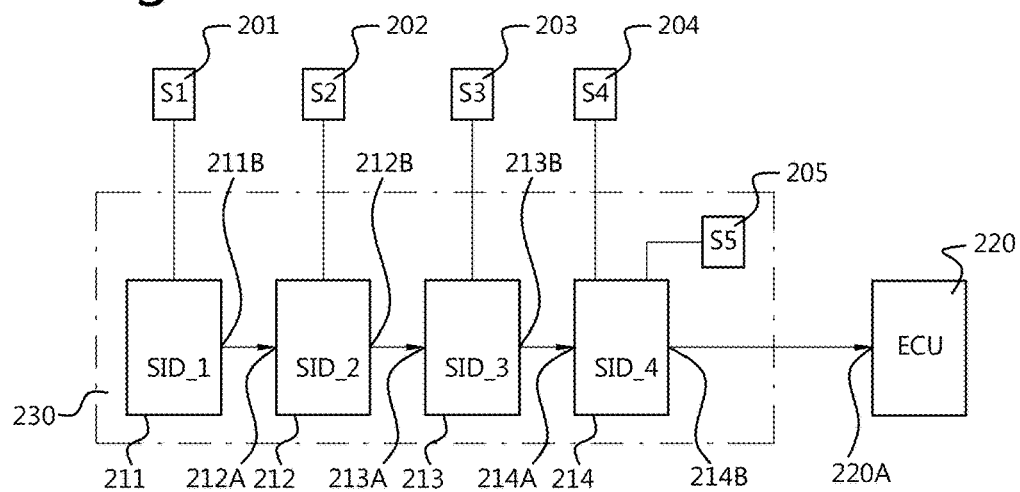
FIG. 2 shows schematically a first embodiment comprising the communication system.

FIG. 2 shows schematically a first embodiment comprising the communication system. In this embodiment, the communication system comprises a chain of four sensor interface devices SID_1, SID_2, SID_3 and SID_4 211 . . . 214. In this example Y=4. Sensing source S1 is coupled to SID_1, Sensing source S2 is coupled to SID_2. Sensing source S3 is coupled to SID_3 and sensing sources S4 and S5 are coupled to SID_4. SID_1 is the first sensor interface device of the chain. SID_2 . . . SID_4 are intermediate sensor interface devices 212 . . . 214, each having an input 212A . . . 214A to receive via the SENT protocol sensor values from a preceding sensor interface device in the chain. The outputs 211B . . . 213B of SID_1, SID_2 and SID_3 repeatedly transmit sensor values to the inputs 212A . . . 214A of SID_2, SID_3 and SID_4 respectively. The output 214B of the last sensor interface device SID_4 of the chain repeatedly transmits sensor values to the central processing unit 220 which might be an electronic control unit ECU.

The sensor interface devices SID_1, SID_2, SID_3 and SID_4 in FIG. 2 are positioned together on a support structure 230. Examples of a support structure 230 are but not limited to: a PCB, multi-chip module or multi-dies package. The sensor interface devices may be in the form of ASIC's (Application Specific Integrated Circuits).

In the embodiment of the communication system in FIG. 2, only one sensing source S5 205 of the five sensing sources 201 . . . 205 is located on the support structure. It might even be possible that sensing source S5 205 is embedded in the ASIC of SID_4 214.

If SID_1 and SID_2 have the same hardware, for SID_1 holds, i=1, P_1=1, Q_1=0 and P_1+Q_1=1.

Figure 3:
FIG. 3 shows schematically the output signal of the first sensor interface device SID_1 in FIG. 2.

FIG. 3 illustrates how the sensor values of sensor S1 are transmitted at the output of the first sensor interface device SID_1 using the SENT protocol. The SENT protocol uses SENT messages to carry data in data Nibbles. Each data Nibble represent 4 bits. A SENT message comprises 6 Data Nibbles and could carry 24 bits of data. In the present example, Nibbles 3, 4, 5 and 6 are used to carry 16 bits sensor values. The first Data Nibble, Frame Control, and the second Data Nibble, DCC (Data Consistency Counter) does not have to be used as only one sensor value has to be transmitted to the subsequent sensor interface device SID_2 of the chain. With SENT message 1, a sensor value A1 related to sensing source S1 is transmitted. In the present description, the number after A refers to a moment in time. For example A1 refers to t=x and Ai refers to t=x+i−1. Table 1 below shows the relation in time when a sensor value is obtained and when the sensor value is transmitted via the output of SID_1. For example, at time=10, the sensor value derived from sensor S1 is A10. Subsequently the value A10 is transmitted in the time between time=1 and time=2 at the output of SID_1. Column 1 indicates the time. Column 2 indicates the value of Sensor S1 obtained by sampling S1 at the corresponding time instant. Column 3 indicates which data is supplied to the output. As Q_1=0, no sensor values has been received via its input in such case SID_1 is a sensor interface device with an input for receiving sensor data via an asynchronous unidirectional protocol. Therefore, only the value of sensor S1 is repeatedly transmitted via the output of SID_1. A group of sensor values at the output comprises sensor values of only one sensor.

As described before, a sensor interface device SID_i transmits repeatedly P_i+Q_i sensor values related to P_i sensor values of sensing sources sampled by the sensor interface device and Q_i sensor values repeatedly received via the input of the sensor interface device. The P_i+Q_i sensor values together form a group. The group to which a signal values belongs is indicated in the last column of table 1. Group comprises a value which is carried by the second Data Nibble of a SENT Message. This Group is used to indicate which subsequent SENT Messages, and thus sensor values, together form the group of P_i+Q_i sensor values. Each time the DCC value is changed with respect to the previous SENT message, for example increased by 1 as in table 1, the start of a new group sensor values is indicated. When the value of DCC is not increased, this indicates that the sensor data in the present message belongs to the same group as the sensor data received with the previous send message. When the value of DCC increases with more than one, this is an indication that some sensor data could be missing and that a group formed by subsequent sensor values is incomplete. In the present application, the DCC value is increased by one at the start of a new group of sensor values to be transmitted by a sensor interface device. A SENT Data Nibble represents a four bits value. Thus, to transmit a DCC value Data Nibble 2 is, such that 16 different DCC values might be used. In the present embodiment, the DCC value runs cyclically from 0 up to 15 to start again with 0. However, it might be possible to use less than 16 values. This might be advantageous to increase the number of sensor values that could be transmitted per second. According to the SENT protocol, the length in time of a Data Nibble increases linear with the value represented by a Data Nibble.

TABLE 1

| | SID_1 | | | |
|---|---|---|---|---|
| | Sensor | | OUT | |
| Time | S1 | SEL | value | Group |
| 1 | A1 | S1 | A1 | 0 |
| 2 | A2 | S1 | A2 | 1 |
| 3 | A3 | S1 | A3 | 2 |
| 4 | A4 | S1 | A4 | 3 |
| 5 | A5 | S1 | A5 | 4 |
| 6 | A6 | S1 | A6 | 5 |
| 7 | A7 | S1 | A7 | 6 |
| 8 | A8 | S1 | A8 | 7 |
| 9 | A9 | S1 | A9 | 8 |
| 10 | A10 | S1 | A10 | 9 |
| 11 | A11 | S1 | A11 | 10 |
| 12 | A12 | S1 | A12 | 11 |
| 13 | A13 | S1 | A13 | 12 |
| 14 | A14 | S1 | A14 | 13 |
| 15 | A15 | S1 | A15 | 14 |
| 16 | A16 | S1 | A16 | 15 |
| 17 | A17 | S1 | A17 | 0 |
| 18 | A18 | S1 | A18 | 1 |
| 19 | A19 | S1 | A19 | 2 |
| 20 | A20 | S1 | A20 | 3 |
| 21 | A21 | S1 | A21 | 4 |
| 22 | A22 | S1 | A22 | 5 |
| 23 | A23 | S1 | A23 | 6 |

TABLE 1-continued

<table>
<tr><th colspan="5">SID_1</th></tr>
<tr><th></th><th colspan="2">Sensor</th><th colspan="2">OUT</th></tr>
<tr><th>Time</th><th>S1</th><th>SEL</th><th>value</th><th>Group</th></tr>
<tr><td>24</td><td>A24</td><td>S1</td><td>A24</td><td>7</td></tr>
<tr><td>25</td><td>A25</td><td>S1</td><td>A25</td><td>8</td></tr>
<tr><td>26</td><td>A26</td><td>S1</td><td>A26</td><td>9</td></tr>
<tr><td>27</td><td>A27</td><td>S1</td><td>A27</td><td>10</td></tr>
<tr><td>28</td><td>A28</td><td>S1</td><td>A28</td><td>11</td></tr>
<tr><td>29</td><td>A29</td><td>S1</td><td>A29</td><td>12</td></tr>
<tr><td>30</td><td>A30</td><td>S1</td><td>A30</td><td>13</td></tr>
<tr><td>31</td><td>A31</td><td>S1</td><td>A31</td><td>14</td></tr>
<tr><td>32</td><td>A32</td><td>S1</td><td>A32</td><td>15</td></tr>
<tr><td>33</td><td>A33</td><td>S1</td><td>A33</td><td>0</td></tr>
</table>

Table 2 relates to sensor interface device SID_2 and shows the time relation between receipt of sensor values at the input 212A, the sampled sensor values of Sensor S2 202 and the data in the subsequent SENT Messages at the output 212B of SID_2 in the seventh column. The first column of Table 2 corresponds to the first column of table 1 indicating the time. The second and third column of Table 2 are similar to the 2 last columns of Table 1 and show the sensor value and corresponding Group (=DCC value) received in the time period from t=x to t=x+1.

In column 4, indicated with REG 1, the value stored in the first storage location is given. As a value is serially received at the input in the time between time=x (start time of receipt value) and time=x+1 (start time of receipt subsequent value), the value is available in the storage location one time moment later. Thus, the value A1 for which the start of serial receipt begins at time=1 and ends before t=2 (is start receipt of subsequent value of a sensing source), is available in the storage REG1 at time=2.

For SID_2 holds, i=2, P_2=1, Q_2=1 and P_2+Q_2=2. As Q_2=1, there is only one storage location REG1 used. As P_2+Q_2=2, sensor interface device has to repeatedly transmit, at its output, a group comprising the values of sensor S1 and S2. Column 6 indicates which sensor value related to one of the P_2 and Q_2 sensing sources is selected to be transmitted. Thus, the signal at the output of SID_2 comprises groups of two sensor values that will serially be transmitted. It can be seen that the sensor value from the sensing source S2 are sampled by SID_2 and transmitted prior to the Q_2=1. Different sensor values in a group are received at the input of SID_2.

It can be seen from Table 2 that not all sensor values of Sensor 1 received at the input of SID_2 are forwarded at the output of SID_2 in the direction of the ECU. When a particular sensor value has to be transmitted, the latest received sensor value at its input will be transmitted. In the present example, Sensor value A2 is received at time=2 at the input and is stored at time=3 in REG1. However, Sensor value A3 is received at time=3 and overwrites the value A2 in storage location REG1. Consequently, the subsequent time the value that is read at time=4 from storage location REG1 is A3 and not A2.

Figure 4:
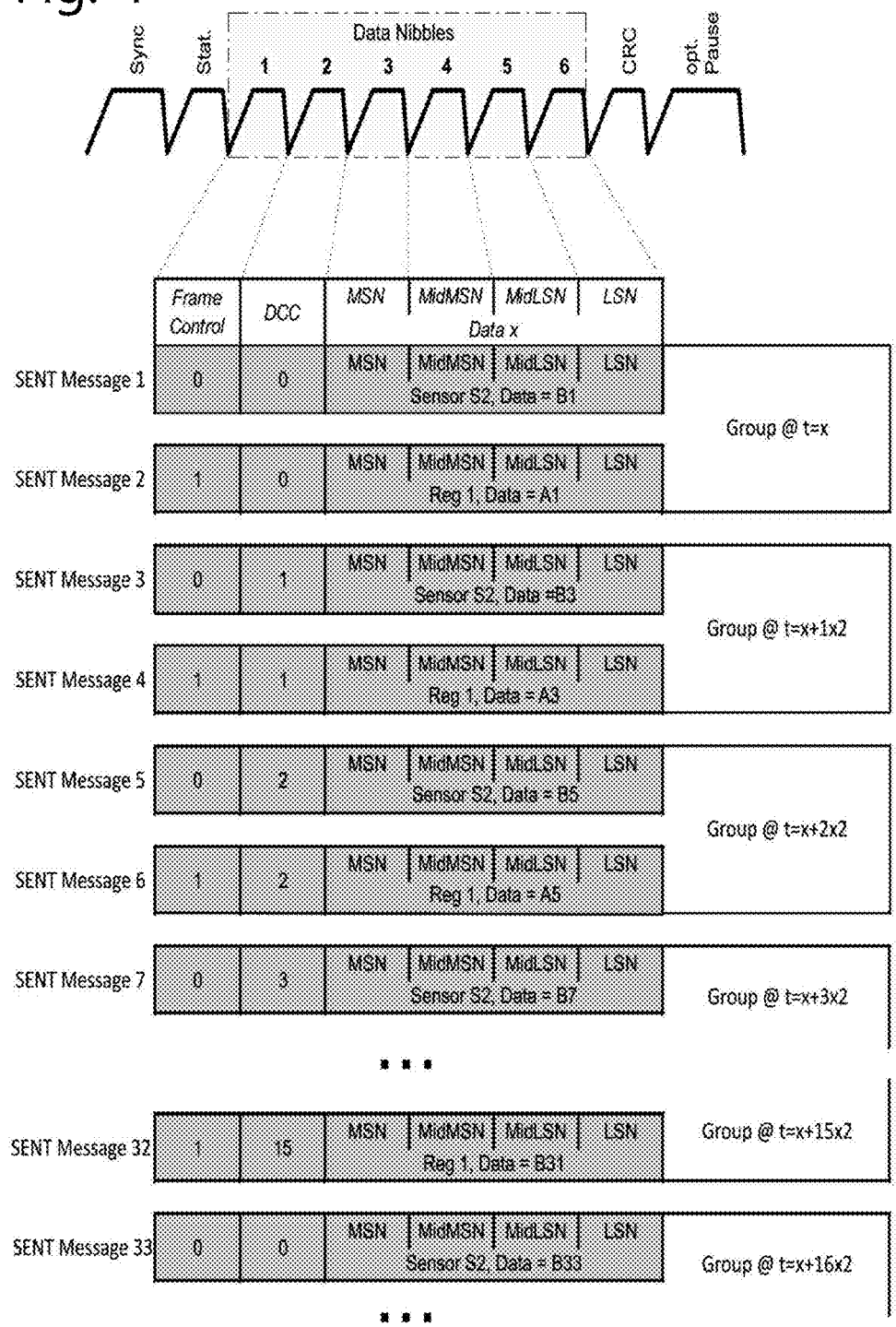
FIG. 4 shows schematically the output signal of the second sensor interface device SID_2 in FIG. 2.

FIG. 4 shows an embodiment of the SENT messages that could be transmitted at the output 202B of SID_2. The first Data Nibble (Frame Control) is used to indicate the sequence number of a sensor value in a group. The first transmitted sensor value of a group comprises the value 0; the second transmitted sensor value of a group comprises the value 1, etc. . . . . As a Data Nibble of a SENT message represents a 4 bit value, with the SENT protocol, a group could comprise up to 16 sensors values related to 16 different sensing sources. Frame Control value 0 (=0000B) indicates the first sensor value in a group and Frame Control value 15 (=1111B) indicates the fifteenth value in a group. When also all possible DCC values are used to indicate the group number, at the output of SID_2, 32 possible combinations of values of Frame Control and DCC nibble are transmitted in 32 subsequent SENT messages.

TABLE 2

<table>
<tr><th colspan="7">SID_2</th></tr>
<tr><th></th><th colspan="2">IN</th><th>REG</th><th>Sensor</th><th colspan="2">OUT</th></tr>
<tr><th>Time</th><th>Value</th><th>Group</th><th>1</th><th>S2</th><th>SEL</th><th>value</th><th>Group</th></tr>
<tr><td>1</td><td>A1</td><td>0</td><td>X</td><td>B1</td><td>S2</td><td>B1</td><td>0</td></tr>
<tr><td>2</td><td>A2</td><td>1</td><td>A1</td><td>B2</td><td>REG1</td><td>A1</td><td>0</td></tr>
<tr><td>3</td><td>A3</td><td>2</td><td>A2</td><td>B3</td><td>S2</td><td>B3</td><td>1</td></tr>
<tr><td>4</td><td>A4</td><td>3</td><td>A3</td><td>B4</td><td>REG1</td><td>A3</td><td>1</td></tr>
<tr><td>5</td><td>A5</td><td>4</td><td>A4</td><td>B5</td><td>S2</td><td>B5</td><td>2</td></tr>
<tr><td>6</td><td>A6</td><td>5</td><td>A5</td><td>B6</td><td>REG1</td><td>A5</td><td>2</td></tr>
<tr><td>7</td><td>A7</td><td>6</td><td>A6</td><td>B7</td><td>S2</td><td>B7</td><td>3</td></tr>
<tr><td>8</td><td>A8</td><td>7</td><td>A7</td><td>B8</td><td>REG1</td><td>A7</td><td>3</td></tr>
<tr><td>9</td><td>A9</td><td>8</td><td>A8</td><td>B9</td><td>S2</td><td>B9</td><td>4</td></tr>
<tr><td>10</td><td>A10</td><td>9</td><td>A9</td><td>B10</td><td>REG1</td><td>A9</td><td>4</td></tr>
<tr><td>11</td><td>A11</td><td>10</td><td>A10</td><td>B11</td><td>S2</td><td>B11</td><td>5</td></tr>
<tr><td>12</td><td>A12</td><td>11</td><td>A11</td><td>B12</td><td>REG1</td><td>A11</td><td>5</td></tr>
<tr><td>13</td><td>A13</td><td>12</td><td>A12</td><td>B13</td><td>S2</td><td>B13</td><td>6</td></tr>
<tr><td>14</td><td>A14</td><td>13</td><td>A13</td><td>B14</td><td>REG1</td><td>A13</td><td>6</td></tr>
<tr><td>15</td><td>A15</td><td>14</td><td>A14</td><td>B15</td><td>S2</td><td>B15</td><td>7</td></tr>
<tr><td>16</td><td>A16</td><td>15</td><td>A15</td><td>B16</td><td>REG1</td><td>A15</td><td>7</td></tr>
<tr><td>17</td><td>A17</td><td>0</td><td>A16</td><td>B17</td><td>S2</td><td>B17</td><td>8</td></tr>
<tr><td>18</td><td>A18</td><td>1</td><td>A17</td><td>B18</td><td>REG1</td><td>A17</td><td>8</td></tr>
<tr><td>19</td><td>A19</td><td>2</td><td>A18</td><td>B19</td><td>S2</td><td>B19</td><td>9</td></tr>
<tr><td>20</td><td>A20</td><td>3</td><td>A19</td><td>B20</td><td>REG1</td><td>A19</td><td>9</td></tr>
<tr><td>21</td><td>A21</td><td>4</td><td>A20</td><td>B21</td><td>S2</td><td>B21</td><td>10</td></tr>
<tr><td>22</td><td>A22</td><td>5</td><td>A21</td><td>B22</td><td>REG1</td><td>A21</td><td>10</td></tr>
<tr><td>23</td><td>A23</td><td>6</td><td>A22</td><td>B23</td><td>S2</td><td>B23</td><td>11</td></tr>
<tr><td>24</td><td>A24</td><td>7</td><td>A23</td><td>B24</td><td>REG1</td><td>A23</td><td>11</td></tr>
<tr><td>25</td><td>A25</td><td>8</td><td>A24</td><td>B25</td><td>S2</td><td>B25</td><td>12</td></tr>
<tr><td>26</td><td>A26</td><td>9</td><td>A25</td><td>B26</td><td>REG1</td><td>A25</td><td>12</td></tr>
<tr><td>27</td><td>A27</td><td>10</td><td>A26</td><td>B27</td><td>S2</td><td>B27</td><td>13</td></tr>
<tr><td>28</td><td>A28</td><td>11</td><td>A27</td><td>B28</td><td>REG1</td><td>A27</td><td>13</td></tr>
<tr><td>29</td><td>A29</td><td>12</td><td>A28</td><td>B29</td><td>S2</td><td>B29</td><td>14</td></tr>
<tr><td>30</td><td>A30</td><td>13</td><td>A29</td><td>B30</td><td>REG1</td><td>A29</td><td>14</td></tr>
<tr><td>31</td><td>A31</td><td>14</td><td>A30</td><td>B31</td><td>S2</td><td>B31</td><td>15</td></tr>
<tr><td>32</td><td>A32</td><td>15</td><td>A31</td><td>B32</td><td>REG1</td><td>A31</td><td>15</td></tr>
<tr><td>33</td><td>A33</td><td>0</td><td>A32</td><td>B33</td><td>S2</td><td>B33</td><td>0</td></tr>
</table>

Table 3 relates to sensor interface device SID_3 and shows the time relation between receipt of sensor values at the input 213A, the sampled sensor values of Sensor S3 203 and the data in the subsequent SENT Messages at the output 213B of SID_3 in the eighth column. The first column corresponds to the first column of Table 1 indicating the time. The second and third column of Table 3 are similar to the 2 last columns of Table 2 and show the sensor value and corresponding Group (=DCC value) received in a time period from t=x to t=x+1.

TABLE 3

<table>
<tr><th colspan="8">SID_3</th></tr>
<tr><th></th><th colspan="2">IN</th><th>REG</th><th>REG</th><th>Sensor</th><th colspan="2">OUT</th></tr>
<tr><th>Time</th><th>Value</th><th>Group</th><th>1</th><th>2</th><th>S3</th><th>SEL</th><th>value</th><th>Group</th></tr>
<tr><td>1</td><td>B1</td><td>0</td><td>X</td><td>X</td><td>C1</td><td>S3</td><td>C1</td><td>0</td></tr>
<tr><td>2</td><td>A1</td><td>0</td><td>B1</td><td>X</td><td>C2</td><td>REG1</td><td>B1</td><td>0</td></tr>
<tr><td>3</td><td>B3</td><td>1</td><td>B1</td><td>A1</td><td>C3</td><td>REG2</td><td>A1</td><td>0</td></tr>
<tr><td>4</td><td>A3</td><td>1</td><td>B3</td><td>A1</td><td>C4</td><td>S3</td><td>C4</td><td>1</td></tr>
<tr><td>5</td><td>B5</td><td>2</td><td>B3</td><td>A3</td><td>C5</td><td>REG1</td><td>B3</td><td>1</td></tr>
<tr><td>6</td><td>A5</td><td>2</td><td>B5</td><td>A3</td><td>C6</td><td>REG2</td><td>A3</td><td>1</td></tr>
</table>

TABLE 3-continued

| | | | | SID_3 | | | |
|---|---|---|---|---|---|---|---|
| | IN | | REG | REG | Sensor | | OUT |
| Time | Value | Group | 1 | 2 | S3 | SEL | value | Group |
| 7 | B7 | 3 | B5 | A5 | C7 | S3 | C7 | 2 |
| 8 | A7 | 3 | B7 | A5 | C8 | REG1 | B7 | 2 |
| 9 | B9 | 4 | B7 | A7 | C9 | REG2 | A7 | 2 |
| 10 | A9 | 4 | B9 | A7 | C10 | S3 | C10 | 3 |
| 11 | B11 | 5 | B9 | A9 | C11 | REG1 | B9 | 3 |
| 12 | A11 | 5 | B11 | A9 | C12 | REG2 | A9 | 3 |
| 13 | B13 | 6 | B11 | A11 | C13 | S3 | C13 | 4 |
| 14 | A13 | 6 | B13 | A11 | C14 | REG1 | B13 | 4 |
| 15 | B15 | 7 | B13 | A13 | C15 | REG2 | A13 | 4 |
| 16 | A15 | 7 | B15 | A13 | C16 | S3 | C16 | 5 |
| 17 | B17 | 8 | B15 | A15 | C17 | REG1 | B15 | 5 |
| 18 | A17 | 8 | B17 | A15 | C18 | REG2 | A15 | 5 |
| 19 | B19 | 9 | B17 | A17 | C19 | S3 | C19 | 6 |
| 20 | A19 | 9 | B19 | A17 | C20 | REG1 | B19 | 6 |
| 21 | B21 | 10 | B19 | A19 | C21 | REG2 | A19 | 6 |
| 22 | A21 | 10 | B21 | A19 | C22 | S3 | C22 | 7 |
| 23 | B23 | 11 | B21 | A21 | C23 | REG1 | B21 | 7 |
| 24 | A23 | 11 | B23 | A21 | C24 | REG2 | A21 | 7 |
| 25 | B25 | 12 | B23 | A23 | C25 | S3 | C25 | 8 |
| 26 | A25 | 12 | B25 | A23 | C26 | REG1 | B25 | 8 |
| 27 | B27 | 13 | B25 | A25 | C27 | REG2 | A25 | 8 |
| 28 | A27 | 13 | B27 | A25 | C28 | S3 | C28 | 9 |
| 29 | B29 | 14 | B27 | A27 | C29 | REG1 | B27 | 9 |
| 30 | A29 | 14 | B29 | A27 | C30 | REG2 | A27 | 9 |
| 31 | B31 | 15 | B29 | A29 | C31 | S3 | C31 | 10 |
| 32 | A31 | 15 | B31 | A29 | C32 | REG1 | B31 | 10 |
| 33 | B33 | 0 | B31 | A31 | C33 | REG2 | A31 | 10 |

In columns 4 and 5, indicated with REG1 and REG2 respectively, the values stored in the first and second storage location are given. In storage location REG1, the first sensor value of a group of sensor values is stored and in storage location REG2, the second sensor value of the group of sensor values is stored.

For SID_3 holds, i=3, P_3=1, Q_3=2 and P_3+Q_3=3. As Q_3=2, there are two storage locations REG1 and REG2 used to store the sensor values of a group. In REG1, the first sensor value of a group is stored and in REG2 the second sensor value of a group is stored. As P_3+Q_3=3, sensor interface device has to transmit at its output repeated a group comprising the values of sensor S3, S2 and S1. Column 7 indicates which sensor value related to one of the P_3 and Q_3 sensing sources is selected to be transmitted. Thus the signal at the output of SID_3 comprises groups of three sensor values that will serially be transmitted. It can be seen that the sensor value from the sensing source S3 which is sampled by SID_3 is transmitted prior to the Q_3=2 different sensor values in subsequent groups received at the input of SID_3.

It the present embodiment, the order of the sensor values of the different sensing sources in a group received at the input 203A is the same as the order of different sensing sources in a group at the output 203B. In this way in general terms, the sensor values of the different sensing sources are submitted at the output of SID_i in the following order: first P_i values of the P_i sensing sources of SID_i, followed by P_i−1 values of the P_i−1 sensing sources of SID_i−1, which are followed by P_i−2 values of the P_i−2 sensing sources of SID_i−2, which finally the sequence of sensor values in a group ends with P_1 values of the P_1 sensing sources of SID 1.

Table 4 relates to sensor interface device SID_4 and shows the time relation between receipt of sensor values at the input 214A, the sampled sensor values of Sensors S4 and S5 204,205 and the data in the subsequent SENT Messages at the output 214B of SID_4 in the tenth column. The first column of table 4 corresponds to the first column of table 1 indicating the time. The second and third column of Table 4 are similar to the 2 last columns of table 3 and show the sensor values and corresponding Group (=DCC value) received in a time period from time=x to time=x+1.

TABLE 4

| | | | | | | SID_4 | | | | |
|---|---|---|---|---|---|---|---|---|---|---|
| | IN | | | | | Sensor | Sensor | | OUT | |
| Time | Value | Group | REG 1 | REG 2 | REG 3 | S4 | S5 | SEL | value | Group |
| 1 | C1 | 0 | X | X | X | D1 | E1 | S5 | E1 | 0 |
| 2 | B1 | 0 | C1 | X | X | D2 | E2 | S4 | D2 | 0 |
| 3 | A1 | 0 | C1 | B1 | X | D3 | E3 | REG1 | C1 | 0 |
| 4 | C4 | 1 | C1 | B1 | A1 | D4 | E4 | REG2 | B1 | 0 |
| 5 | B3 | 1 | C4 | B1 | A1 | D5 | E5 | REG3 | A1 | 0 |
| 6 | A3 | 1 | C4 | B3 | A1 | D6 | E6 | S5 | E6 | 1 |
| 7 | C7 | 2 | C4 | B3 | A3 | D7 | E7 | S4 | D7 | 1 |
| 8 | B7 | 2 | C7 | B3 | A3 | D8 | E8 | REG1 | C7 | 1 |
| 9 | A7 | 2 | C7 | B7 | A3 | D9 | E9 | REG2 | B7 | 1 |
| 10 | C10 | 3 | C7 | B7 | A7 | D10 | E10 | REG3 | A7 | 1 |
| 11 | B9 | 3 | C10 | B7 | A7 | D11 | E11 | S5 | E11 | 2 |
| 12 | A9 | 3 | C10 | B9 | A7 | D12 | E12 | S4 | D12 | 2 |
| 13 | C13 | 4 | C10 | B9 | A9 | D13 | E13 | REG1 | C10 | 2 |
| 14 | B13 | 4 | C13 | B9 | A9 | D14 | E14 | REG2 | B9 | 2 |
| 15 | A13 | 4 | C13 | B13 | A9 | D15 | E15 | REG3 | A9 | 2 |
| 16 | C16 | 5 | C13 | B13 | A13 | D16 | E16 | S5 | E16 | 3 |
| 17 | B15 | 5 | C16 | B13 | A13 | D17 | E17 | S4 | D17 | 3 |
| 18 | A15 | 5 | C16 | B15 | A13 | D18 | E18 | REG1 | C16 | 3 |
| 19 | C19 | 6 | C16 | B15 | A15 | D19 | E19 | REG2 | B15 | 3 |
| 20 | B19 | 6 | C19 | B15 | A15 | D20 | E20 | REG3 | A15 | 3 |
| 21 | A19 | 6 | C19 | B19 | A15 | D21 | E21 | S5 | E21 | 4 |
| 22 | C22 | 7 | C19 | B19 | A19 | D22 | E22 | S4 | D22 | 4 |
| 23 | B21 | 7 | C22 | B19 | A19 | D23 | E23 | REG1 | C22 | 4 |
| 24 | A21 | 7 | C22 | B21 | A19 | D24 | E24 | REG2 | B21 | 4 |
| 25 | C25 | 8 | C22 | B21 | A21 | D25 | E25 | REG3 | A21 | 4 |
| 26 | B25 | 8 | C25 | B21 | A21 | D26 | E26 | S5 | E26 | 5 |
| 27 | A25 | 8 | C25 | B25 | A21 | D27 | E27 | S4 | D27 | 5 |

TABLE 4-continued

| | | | | | | | | | | |
|---|---|---|---|---|---|---|---|---|---|---|
| | | | | SID_4 | | | | | | |
| | | IN | | | | Sensor | Sensor | | OUT | |
| Time | Value | Group | REG 1 | REG 2 | REG 3 | S4 | S5 | SEL | value | Group |
| 28 | C28 | 9 | C25 | B25 | A25 | D28 | E28 | REG1 | C25 | 5 |
| 29 | B27 | 9 | C28 | B25 | A25 | D29 | E29 | REG2 | B25 | 5 |
| 30 | A27 | 9 | C28 | B27 | A25 | D30 | E30 | REG3 | A25 | 5 |
| 31 | C31 | 10 | C28 | B27 | A27 | D31 | E31 | S5 | E31 | 6 |
| 32 | B31 | 10 | C31 | B27 | A27 | D32 | E32 | S4 | D32 | 6 |
| 33 | A31 | 10 | C31 | B31 | A27 | D33 | E33 | REG1 | C31 | 6 |

In columns 4, 5 and 6, indicated with REG1, REG2 and REG3 respectively, the values stored in the first, second and third storage location are given. In storage location REG1, the first sensor value of a group of sensor values is stored. In storage location REG2, the second sensor value of the group of sensor values is stored, etc.

For SID_4 holds, i=4, P_4=2, Q_4=3 and P_4+Q_4=5. As P_3+Q_3=3, sensor interface device SID_4 has to transmit at its output repeatedly a group comprising the values of sensor S5, S4, S3, S2 and S1. Column 8 indicates which sensor value related to one of the P_2 and Q_2 sensing sources is selected to be transmitted. Thus, the signal at the output of SID_3 comprises groups of five sensor values that will be serially transmitted. It can be seen that the sensor value from the sensing sources S5 and S4 which is sampled by SID_4 are transmitted prior to Q_4=3 sensor values related to the three difference sensing sources S3, S2 and S1 received in subsequent groups at the input of SID_4.

Figure 5:
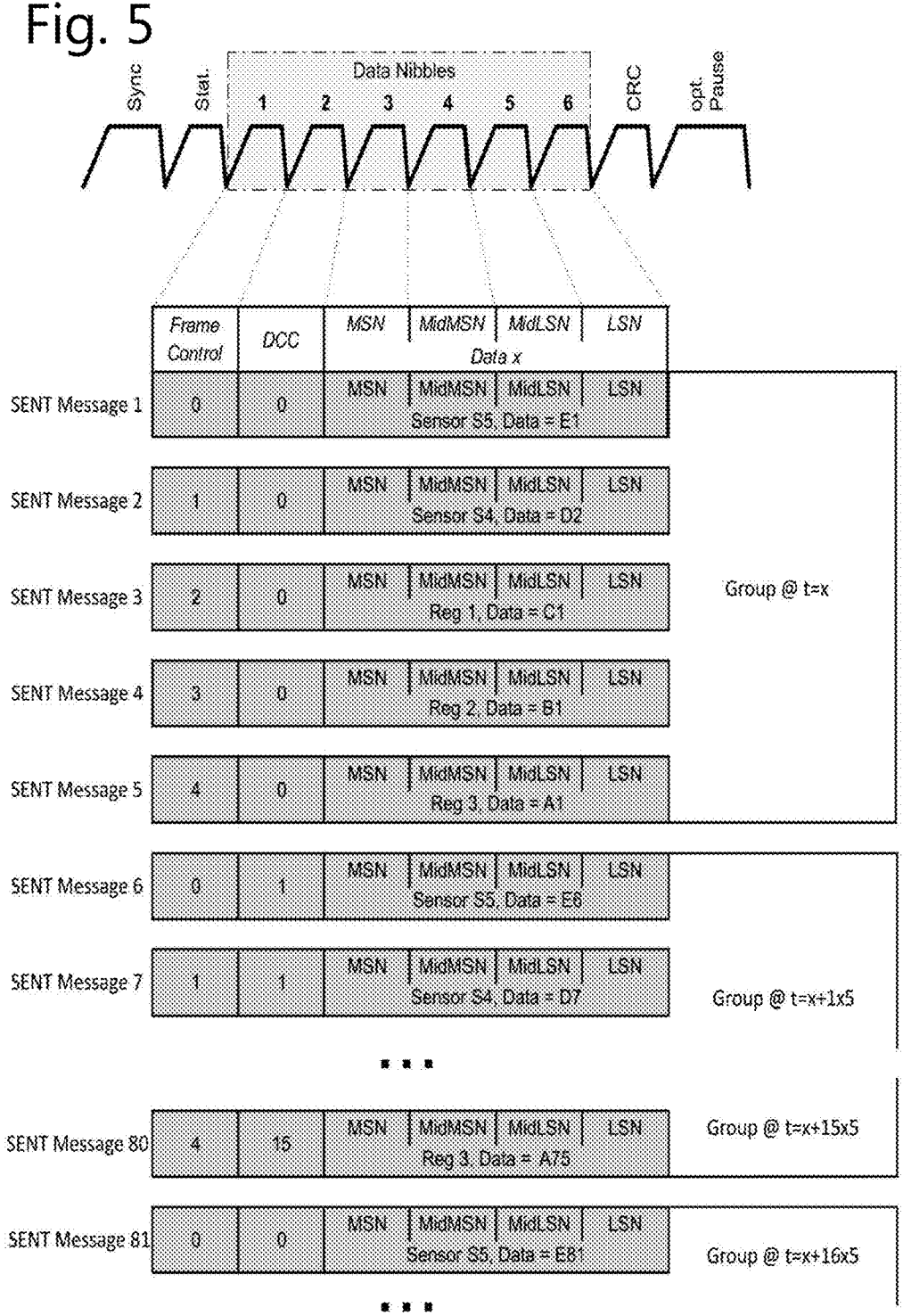
FIG. 5 shows schematically the output signal of the fourth sensor interface device SID_4 in FIG. 2 and, FIG. 6 shows schematically a second embodiment comprising the communication system.

FIG. 5 shows an embodiment of the SENT messages that could be transmitted from the output 214B of SID_4 to the input 220A of ECU 220 shown in FIG. 1. The first Data Nibble (Frame Control) is used to indicate the sequence number of a sensor value in a group. The first transmitted sensor value of a group comprises the Frame Control value 0, and last transmitted sensor value of a group of five sensor values including the Frame Control value 4. When all possible DCC values are used to indicate the group number, at the output of SID_4, 80 possible combinations of values of Frame Control and DCC nibble are transmitted in 80 subsequent SENT messages. Repeatedly 5 subsequent SENT messages form a group which carries a sensor value for each of the five sensing sources.

The sequence number of the sensor values in the tables corresponds to the sampling time. It has been found that the order of transmitting the sensor values at the output of a sensor interface device, i.e. received sensor values at input prior to own sampled sensor value or own sampled sensor values prior to received sensor values at input, does not have effect on the average latency between sampling time of all sensing sources in a group and receipt at the ECU. However, transmitting the sensor values of the sensing sources sampled by a sensor interface device prior to transmitting the sensor values at the input of the sensor interface device has the advantage that differences between the sampling times of the sensor values in a group is less than when the sensor values at the input are transmitted prior to the sampled values by the sensor interface device.

From Table 4 can be learned that the sampling times of the five sensor values in the first group are 1, 2, 1, 1, 1. The sampling times of the five sensor values in the second group are 6, 7, 7, 7, and 7. The sampling times of the five sensor values in the third group are 11, 12, 10, 9, and 9. The sampling times of the five sensor values in the fourth group are 21, 22, 22, 21, 21 and the sampling times of the five sensor values in the fifth group are 26, 27, 25, 25, and 25. The largest difference is in Table 4 in the third group 3 (=12-9) time periods. In the embodiment given in table 4, a sensor value of a sensing source is generated each time a SENT message is transmitted. In this way, the latency from sensor interface device to ECU is the smallest. By generating a sensor value of all the sensing sources of a sensor interface device only at the beginning of transmission of a group, the average latency of the sensor values in a group increases, but the differences in latency in said group will decrease. For example, the sampling times of the five sensor values in the third group will then be 11, 11, 10, 9, and 9 and for the fifth group they will be 26, 26, 25, 25, and 25. In other words, the latency for the sensor value of the sensing source S4 increases one time period and the maximum difference between sampling times of the sensor values in group decreases in some case with one time period. This embodiment is advantageous in case it is important for the control process in the ECU that the sensor values of a group are obtained at substantially the same time instant.

Figure 6:
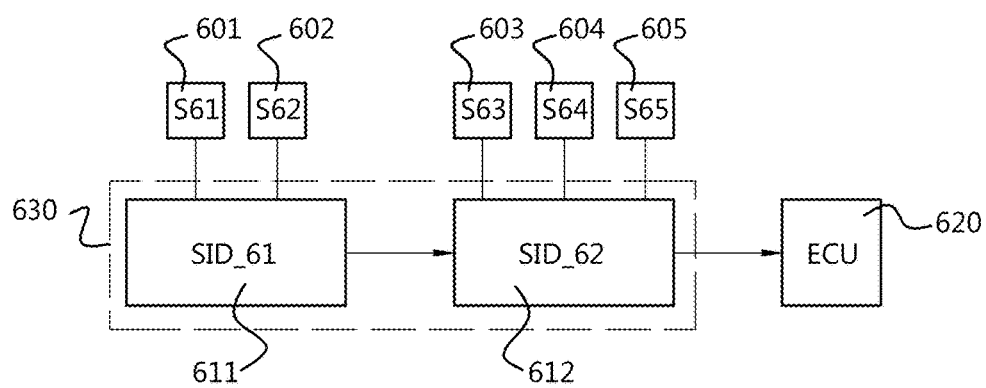

FIG. 6 shows schematically a second embodiment of the communication system. The communication system comprises a chain with two sensor interface devices 611, 612. The first sensor interface device SID_61 is configured to sample two pressure sensors 601, 602. The second sensor interface device SID_62 is configured to sample three temperature sensors 603, 604, 605. An output of the first sensor interface device SID_61 is electrically coupled to an input of the second sensor interface device SID_62. An output of the second sensor interface device SID_62 is electrically coupled to an input of ECU 620. For communication over the electrical connections, an asynchronous unidirectional protocol is used, e.g. the SENT-protocol.

Table 5 relates to sensor interface device SID_62 and shows the time relation between receipt of subsequent first data groups comprising sensor data of the pressure sensors S61 and S62 at its input, the data values of temperature sensors S63, S64 and S65 and the data in the subsequent second data groups at the output of SID_62. The first column of table 5 indicates subsequent time instants. The second and third column of Table 5 show the data values related the two pressure sensors coupled to sensor interface device SID_61 in subsequent groups. The values starting with letter A relate to the first pressure sensor S61 and the values starting with letter B relate to the second pressure sensor S62. The number of the value indicates the time instant at which the corresponding sensor value has been obtained. Thus, a value A23 in table 5 indicates the data value of pressure sensor S61 obtained at time instant 23. In columns 4 and 5, indicated with REG1 and REG2 respectively, the values stored in the first and second storage location are given. In storage location REG1, the first data value of a first data group is stored. In storage location REG2, the second data value of a first data group is stored.

Columns 6-8 show the symbolic values of the temperature sensors S63, S64 and S65 respectively at corresponding time instances. Column 9 shows which memory location or temperature sensor will be read for transmission at respective time instances. Finally, columns 10 and 11 show the data value and corresponding second data group value.

In the present embodiment, the second data group comprises 15 data values related to five sensing sources S61-S65. As temperature is normally a relatively slow varying physical quantity compared to pressure, the data rate of data values from each of the temperature sensors might be smaller than the data rate of data values from each of the pressure sensors. Each second data group comprises 6 data values of each pressure sensor and one data value of each temperature sensor. Consequently, the data rate of the pressure sensors is six times higher than the data rate of the temperature sensors.

In the embodiments disclosed above, the data value stored in a register related to a particular sensor is always overwritten by the latest received data value. When the data rate of a particular sensor at the input of a sensor interface is higher than the data rate at the output, this results in skipping some data values of said particular sensor. For example in Table 5, the data values A9, A19 and A 29 received at the input are skipped for transmission at the output. In alternative embodiments, other functions could be used to determine the data value to be stored in a register. For example, in application in which the height of peaks in the sensor signal are important, the function might be storing in the corresponding register the maximum value of the data values of a particular sensor after reading the content from said register for transmission. In that case, if the data value A9 was higher than the data value A11, the data value was not overwritten by the data value 11 and consequently data value A9 was transmitted at the output to the ECU. Other possible functions are not limited to: deriving the average or minimum of the data values received after reading the content from the memory location for transmission.

TABLE 5

| | | | | | | | | | | |
|---|---|---|---|---|---|---|---|---|---|---|
| | | | | | SID_62 | | | | | |
| | IN | | | | Sensor | Sensor | Sensor | | OUT | |
| Time | Value | Group | REG 1 | REG 2 | S63 | S64 | S65 | SEL | value | Group |
| 1 | A1 | 0 | X | X | C1 | D1 | E1 | S3 | C1 | 0 |
| 2 | B2 | 0 | A1 | X | C2 | D2 | E2 | REG1 | A1 | 0 |
| 3 | A3 | 1 | A1 | B2 | C3 | D3 | E3 | REG2 | B2 | 0 |
| 4 | B4 | 1 | A3 | B2 | C4 | D4 | E4 | REG1 | A3 | 0 |
| 5 | A5 | 2 | A3 | B4 | C5 | D5 | E5 | REG2 | B4 | 0 |
| 6 | B6 | 2 | A5 | B4 | C6 | D6 | E6 | S4 | D6 | 0 |
| 7 | A7 | 3 | A5 | B6 | C7 | D7 | E7 | REG1 | A5 | 0 |
| 8 | B8 | 3 | A7 | B6 | C8 | D8 | E8 | REG2 | B6 | 0 |
| 9 | A9 | 4 | A7 | B8 | C9 | D9 | E9 | REG1 | A7 | 0 |
| 10 | B10 | 4 | A9 | B8 | C10 | D10 | E10 | REG2 | B8 | 0 |
| 11 | A11 | 5 | A9 | B10 | C11 | D11 | E11 | S5 | E11 | 0 |
| 12 | B12 | 5 | A11 | B10 | C12 | D12 | E12 | REG1 | A11 | 0 |
| 13 | A13 | 6 | A11 | B12 | C13 | D13 | E13 | REG2 | B12 | 0 |
| 14 | B14 | 6 | A13 | B12 | C14 | D14 | E14 | REG1 | A13 | 0 |
| 15 | A15 | 7 | A13 | B14 | C15 | D15 | E15 | REG2 | B14 | 0 |
| 16 | B16 | 7 | A15 | B14 | C16 | D16 | E16 | S3 | C16 | 1 |
| 17 | A17 | 8 | A15 | B16 | C17 | D17 | E17 | REG1 | A15 | 1 |
| 18 | B18 | 8 | A17 | B16 | C18 | D18 | E18 | REG2 | B16 | 1 |
| 19 | A19 | 9 | A17 | B18 | C19 | D19 | E19 | REG1 | A17 | 1 |
| 20 | B20 | 9 | A19 | B18 | C20 | D20 | E20 | REG2 | B18 | 1 |
| 21 | A21 | 10 | A19 | B20 | C21 | D21 | E21 | S4 | D21 | 1 |
| 22 | B22 | 10 | A21 | B20 | C22 | D22 | E22 | REG1 | A21 | 1 |
| 23 | A23 | 11 | A21 | B22 | C23 | D23 | E23 | REG2 | B22 | 1 |
| 24 | B24 | 11 | A23 | B22 | C24 | D24 | E24 | REG1 | A23 | 1 |
| 25 | A25 | 12 | A23 | B24 | C25 | D25 | E25 | REG2 | B24 | 1 |
| 26 | B26 | 12 | A25 | B24 | C26 | D26 | E26 | S5 | E26 | 1 |
| 27 | A27 | 13 | A25 | B26 | C27 | D27 | E27 | REG1 | A25 | 1 |
| 28 | B28 | 13 | A27 | B26 | C28 | D28 | E28 | REG2 | B26 | 1 |
| 29 | A29 | 14 | A27 | B28 | C29 | D29 | E29 | REG1 | A27 | 1 |
| 30 | B30 | 14 | A29 | B28 | C30 | D30 | E30 | REG2 | B28 | 1 |
| 31 | A31 | 15 | A29 | B30 | C31 | D31 | E31 | S3 | C31 | 2 |
| 32 | B32 | 15 | A31 | B30 | C32 | D32 | E32 | REG1 | A31 | 2 |
| 33 | A33 | 0 | A31 | B32 | C33 | D33 | E33 | REG2 | B32 | 2 |

It might be clear for the skilled person in the art that it is not essential to use the Frame Control Data Nibble and the DCC Data Nibble. An indication at predefined locations in a sequence of SENT messages indicating the start of a Group would be sufficient. The use of the Frame Control Data Nibble for indication of the sequence number in the group associated with a sensor value and the DCC Data Nibble for indicating a group number is advantageous to detect errors in the communication. For example, if a SENT message is missed at an input of a sensor interface device SID_i, this could be detected as the DCC value of the new received SENT message does not correspond to the expected DCC value, which should be the latest received DCC value incremented with 1.

Furthermore, by combining the Frame Control Data Nibble and the DCC Data Nibble, it is possible to create a group comprising 256 data values. The value obtained by combination of the Frame Control Data Nibble and the DCC Data Nibble is than an indication to which sensing source the data value relates. The ECU finally has to use this indication to be able to know where and how to process the data values correctly.

In the given embodiments, with a SENT message, four Data Nibbles are used to transmit the sensor value. These four data nibbles could be used to transmit a 16 bit sensor value (each Data Nibble represents 4 bits) or a 12 bit sensor value (each Data Nibble represents 3 bits). However, it might also be possible to transmit two 8-bit sensor values with one SENT message.

It should further be noted that in the description given, it is assumed that all sensor interface devices start transmitting a SENT message at the same time. In practice this would never be the case as each sensor interface device is running on its own clock frequency. Furthermore, the duration of a SENT message depends on the values of a data nibble to be transmitted. The time period to transmit a value 0 is less than transmitting a value 15. Thus, the number of groups that are sent per second could vary in dependence of the sensor values transmitted.

Furthermore, in the examples given above, a sensor interface device continuously generates SENT messages as fast as possible. It might be possible that the sensor interface device comprises a parameter to set the number of groups that have to be transmitted per second. This embodiment could be advantageous with respect to power consumption of the communication system.

Furthermore, in the examples given above, a sensor interface device transmits each time a new sensor value is retrieved from its sensing source. In other words, the rate of new sensor values from each of its sensing sources is equal to or higher than the transmission rate of said sensor values in the output signal. However, it might be possible that the rate of new sensor values is lower than the transmission rate of said sensor values in the output signal. This means that a sensor value is transmitted more than one time, for example in two or more subsequent second data groups. This feature of generating data values from a sensing source at a rate lower than the transmission rate of data values of said sensing source could be used in transmission of a slowly varying physical quantity such as temperature or atmospheric pressure to an ECU.

The present application describes a communication system for transmitting sensor values to an ECU. The communication system comprises a chain of ASICs (sensor interface devices). One or more sensing sources are coupled to each ASIC. All sensors connected to an ASIC are measured by said ASIC to obtain sensor values for transmission to an ECU. The first ASIC in the chain acts as a conventional multi sensor ASIC which generates a SENT stream which is fed to an input of a second ASIC of the chain. The second ASIC is able to read and decode the SENT stream. The second ASIC also measures the sensors connected thereto and combines the measurements with the measurements of the first ASIC to one SENT output stream carrying the sensor values of all sensors connected to the first and second ASIC. The last ASIC of the chain is able to read and decode a SENT stream carrying sensor values of all sensors connected to the other ASIC of the chain and to combine these measurements with measurements of the sensors connected thereto to one SENT output stream for transmission to the ECU.

The sensor interface device might be implemented with dedicated hardware, a processing unit running a software program, programmable logic or any combination of hardware, software or programmable logic. It is envisioned that such hardware and other components such as the ECU are application specific non-generic specialized hardware in most applications. A sensor interface device could comprise a setting for each memory location or sampled sensing source to set for example the function to be performed on the received data values for said memory location or the number of times data values of the related sensing source have to be included in second data groups. Such settings will make a sensor interface device flexible to be used in multiple applications.

While the invention has been described in terms of several embodiments, it is contemplated that alternatives, modifications, permutations and equivalents thereof will become apparent to those skilled in the art upon reading the specification and upon study of the drawings. The invention is not limited to the illustrated embodiments. Changes can be made without departing from the scope of the appended claims.

The invention claimed is:

1. A communication system for transmitting sensor values from N sensing sources to a control unit, N being an integer greater than 1, the communication system comprising:
   a first sensor interface device SID_1 for: sampling M sensing sources to obtain M sensor values related to M sensing sources, M being an integer greater than 0; and transmitting, at an output of the first sensor interface device, the M sensor values related to the M sensing sources using an asynchronous unidirectional protocol;
   Y−1 intermediate sensor interface devices SID_i, wherein Y is an integer greater than 1 and $2 \leq i \leq Y$; and
   each intermediate sensor interface device SID_i for sampling P_i sensing sources to obtain sensor values related to the P_i sensing sources, P_i being an integer greater than 0,
   wherein: the intermediate sensor interface devices SID_i receive at an input, first data groups comprising data values related to Q_i sensing sources using the asynchronous unidirectional protocol, Q_i being an integer greater than 0; the intermediate sensor interface devices SID_i transmit via an output, second data groups comprising sensor values related to the P_i sensing sources and data values related to the Q_i sensing sources using the asynchronous unidirectional protocol; and the input of intermediate sensor interface device SID_2 being coupled to the output of sensor interface device SID_1 and for i>2, the input of intermediate sensor interface device SID_i being coupled to the output of sensor interface device SID_i−1,
   wherein the output of intermediate sensor interface device SID_Y transmits third data groups, each third data group comprising sensor values related to the P_Y sensing sources of sensor interface device SID_Y and data values related to Q_Y sensing sources, the third data groups being transmitted to an input of the control unit using the asynchronous unidirectional protocol, wherein P_Y+Q_Y=N.

2. The communication system according to claim 1, wherein the intermediate sensor interface device SID_i determines from the data values of first data groups for each of the Q_i sensing sources a storage value to be stored in a memory location associated with a corresponding sensing source and, the sensor interface device SID_i transmits the storage value from the memory location associated with the corresponding sensing source in a second data group.

3. The communication system according to claim 2, wherein the storage value in a storage location associated with one of the Q_i sensing sources is one of: an average value; a maximum value; a minimum value; a first value;

and a latest value of the data values related to the one of the Q_i sensing sources retrieved the first data groups after transmission of the storage value from said storage location associated with said one of the Q_i sensing sources.

4. The communication system according to claim 1, wherein the intermediate sensor interface device transmits, in a second data group, two or more data values related to at least one of the P_i and the Q_i sensing sources.

5. The communication system according to claim 1, wherein the second data groups comprises P_i+Q_i data values related to the P_i sensing sources and the Q_i sensing sources.

6. The communication system according to claim 5, wherein the intermediate sensor interface device SID_i transmits, in a second data group, the P_i data values related to the P_i sensing sources prior to the Q_i sensor values related to the Q_i sensing sources.

7. The communication system according to claim 5, wherein the intermediate sensor interface device SID_i includes a detector configured to derive the number Q_i of sensor values related to Q_i sensing sources from a signal received at the input of sensor interface device SID_i; and wherein the intermediate sensor interface device adapts a number of transmitted sensor values of corresponding sensing sources in response to the derived number Q_i.

8. The communication system according to claim 1, wherein a sensing source of the P_i sensing sources of intermediate sensor interface device SID_i is coupled to a sensor input of the sensor interface device SID_i or is embedded in the sensor interface device SID_i.

9. The communication system according to claim 1, wherein the asynchronous unidirectional protocol is the SENT protocol.

10. The communication system according to claim 1, wherein the intermediate sensor interface device SID_i is implemented as an ASIC.

11. The communication system according to claim 1, wherein the first sensor interface device and intermediate sensor interface devices are combined into one electrical component.

12. A method for transmitting sensor values from N sensing sources to a control unit, N being an integer greater than 1, the method comprising:
a sensor interface device SID_1 sampling M sensing sources to obtain M sensor values related to the M sensing sources, M being an integer greater than 0;
sensor interface device SID_1 transmitting at M sensor values related to the M sensing sources to an intermediate sensor interface device SID_2 using an asynchronous unidirectional protocol;
intermediate sensor interface devices SID_i sampling P_i sensing sources to obtain sensor values related to the P_i sensing sources, P_i being an integer greater than 0, wherein $2 \leq i \leq Y$ and $Y \geq 2$;
the sensor interface devices SID_i receive first data groups at an input using the asynchronous unidirectional protocol, the first data groups including data values related to Q_i sensing sources from sensor interface device SID_i−1, wherein Q_i is an integer greater than 0;
the sensor interface device SID_i transmitting second data groups at an output using the asynchronous unidirectional protocol, the second data groups including sensor values related to the P_i sensing sources and data values related to the Q_i sensing sources; and,
the control unit receiving, at an input, second data groups transmitted by sensor interface device SID_Y using the asynchronous unidirectional protocol, wherein the second data groups include data values related to P_Y+Q_Y sensing sources, wherein P_Y+Q_Y=N.

13. The method according to claim 12, wherein the method further comprises: the intermediate sensor interface device SID_i determining from the data values of first data groups for each of the Q_i sensing sources, a storage value; storing the storage value in a memory location associated with a corresponding sensing source; and transmitting the storage value from the memory location associated with the corresponding sensing source in a second data group.

14. The method according to claim 12, wherein the asynchronous unidirectional protocol is the SENT protocol.

* * * * *